July 23, 1929.    E. C. MILLER    1,721,707
WEATHER STRIP
Filed March 19, 1928
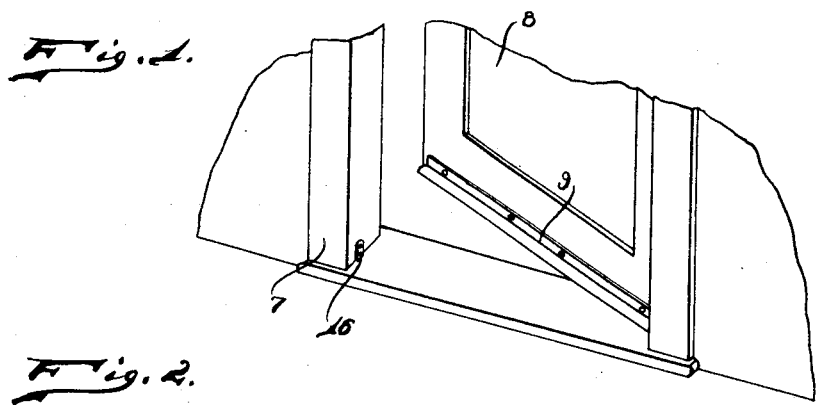
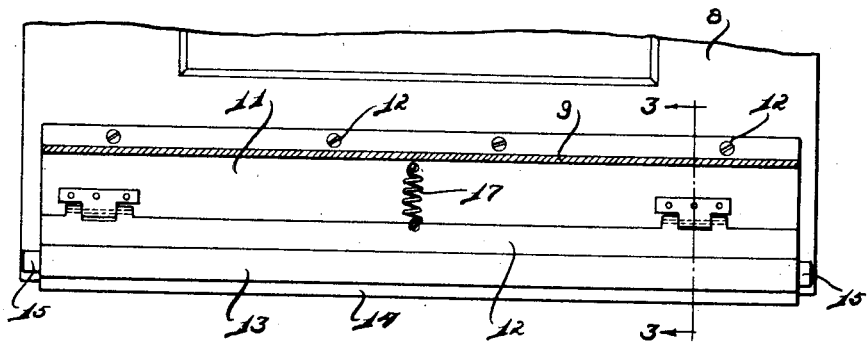
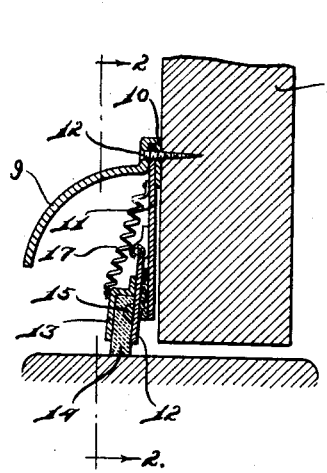
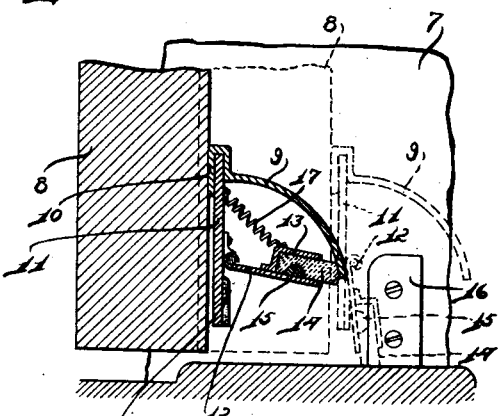
INVENTOR.
Edward C. Miller.
BY
ATTORNEY.

Patented July 23, 1929.

1,721,707

UNITED STATES PATENT OFFICE.

EDWARD C. MILLER, OF DETROIT, MICHIGAN.

WEATHER STRIP.

Application filed March 19, 1928. Serial No. 262,628.

My invention relates to a new and useful improvement in a weather strip adapted for mounting on doors and other similar devices, and has for its object the provision of a weather strip which is swingably mounted and which will be durable in structure, economical of manufacture and highly efficient in use.

Another object of the invention is the provision of a weather strip of this class having a sealing member for sealing the crevice at the bottom of the swingable structure on which mounted and a sealing member for sealing above the crevice so as to prevent passage of drafts around the weather strip proper and into the room.

Another object of the invention is the provision of a shield and a supporting member so arranged and constructed that they may be easily and quickly attached to a door and removed therefrom and retain the sealing member in position.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention showing it applied.

Fig. 2 is a longitudinal sectional view of the invention taken on line 2—2 of Fig. 3.

Fig. 3 is a sectional view taken on line 3—3 of Fig. 2, showing the weather strip in operative position.

Fig. 4 is a view similar to Fig. 3 showing the weather strip in inoperative position.

In the drawings I have illustrated a door casing 7 and a swingably mounted door 8. The invention is shown applied and comprises a shield 9 having one edge 10 doubled upon itself and engaging a supporting plate 11, suitable fastening means 12 being projected through the doubled over portion of the shield and the supporting plate 11 to secure the device on the door 8. Swingably mounted on the lower end of the supporting plate is a carrying plate 12 having an L-shaped clip 13 secured thereon. Clamped by this L-shaped clip and the supporting plate 12 is a flexible strip 14 made of leather, rubber, or other suitable material, and extending longitudinally thereof is a reinforcing rib 15 which, as shown in Fig. 2, projects beyond the ends of the retaining plate, and upon a swinging of the door to closed position, is adapted to engage an abutment plate 16 which is mounted on the casing 7. A spring 17 serves normally to retain the weather strip in elevated position, as shown in Fig. 4.

In operation, as the door is swung to closed position, the projecting end of the reinforcing rib 15 will engage the abutment plate 16, serving to rock the supporting plate 12 on its pivot against the tension of the spring 17, and bring the weather strip into sealing position, as shown in Fig. 3. At the same time the surface of the carrying plate 12 will engage a pad of yieldable material 18, such as felt, or the like, which is mounted on the face of the supporting plate 11, thus preventing passage of drafts over the carrying plate 12 and thence downwardly and under the door 8, so that the weather strip is sealed on the door as well as sealed against the floor.

When the door is moved to open position, the spring 17 will automatically raise the weather strip to elevated position so that a clearance of rugs or other projections on the floor is easily passed over by the weather strip and a tight and close sealing connection made with the floor.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A weather strip of the class described, comprising: a shield; a supporting plate mounted on said shield and depending therefrom; a carrying plate swingably mounted on said supporting plate intermediate its upper and lower edges; a weather strip mounted on said carrying plate and adapted for engaging the floor upon swinging of said carrying plate toward said supporting plate; a yieldable strip of material on the face of said supporting plate for engaging the face of said carrying plate upon the swinging of the same theretoward beyond a predetermined distance; and resilient means for normally retaining said weather strip swung clear of the floor.

2. A weather strip of the class described, comprising: a shield having its upper edge doubled upon itself; a supporting plate engaging the inner face of said doubled over portion of said shield and depending therefrom; a plate swingably mounted on said supporting plate above the lower edge thereof; an L-shaped clip mounted on said swingably mounted plate; and a flexible strip of material clamped against said carrying plate by said L-shaped clip.

3. In a weather strip of the class described, a supporting member; a weather strip carrying member swingably mounted on said supporting member and adapted for swinging into close relation to said supporting member; and yieldable material mounted on one face of said supporting member for engaging said swingably mounted member upon swinging movement of the same toward said supporting member beyond a predetermined distance.

In testimony whereof I have signed the foregoing specification.

EDWARD C. MILLER.